United States Patent
Behr et al.

(10) Patent No.: US 6,673,468 B1
(45) Date of Patent: Jan. 6, 2004

(54) COMPOSITE MATERIAL MADE OF TWO STEEL COVER SHEETS RESISTANCE-WELDED TOGETHER AND AN INTERMEDIATE LAYER

(75) Inventors: Friedrich Behr, Krefeld (DE); Hans-Dieter Gall, Duisburg (DE); Cetin Nazikkol, Duisburg (DE)

(73) Assignee: Thyssen Krupp Stahl AG, Dusseldorf (DE)

( * ) Notice: Subject to any disclaimer, the term of this patent is extended or adjusted under 35 U.S.C. 154(b) by 0 days.

(21) Appl. No.: 09/889,072
(22) PCT Filed: Dec. 3, 1999
(86) PCT No.: PCT/EP99/09486
§ 371 (c)(1),
(2), (4) Date: Dec. 3, 2001
(87) PCT Pub. No.: WO00/41878
PCT Pub. Date: Jul. 20, 2000

(30) Foreign Application Priority Data

Jan. 15, 1999 (DE) .......................... 199 01 313

(51) Int. Cl.⁷ ...................... B32B 15/04; B32B 15/08; B32B 15/18
(52) U.S. Cl. ...................... 428/626; 428/683; 428/682; 428/198; 428/414; 428/416; 428/457
(58) Field of Search ................. 428/626, 624, 428/681, 682, 68, 76, 105, 198, 223, 323, 328, 413, 414, 416, 418, 457, 458, 460, 461, 462, 463, 425.8, 539.5, 465, 683, 684, 685

(56) References Cited

U.S. PATENT DOCUMENTS

| | | | | |
|---|---|---|---|---|
| 4,353,951 A | * | 10/1982 | Yukitoshi et al. | 428/198 |
| 4,749,623 A | * | 6/1988 | Endo et al. | 428/551 |
| 4,978,582 A | * | 12/1990 | Stamm et al. | 428/551 |

FOREIGN PATENT DOCUMENTS

| | | |
|---|---|---|
| DE | 3815069 | 11/1989 |
| DE | 4331787 | 4/1994 |
| DE | 19621952 A1 | 12/1997 |
| EP | 0579534 A | 1/1994 |
| EP | 0842766 A | 5/1998 |

* cited by examiner

*Primary Examiner*—Michael La Villa
(74) *Attorney, Agent, or Firm*—Proskauer Rose LLP

(57) ABSTRACT

The invention concerns a composite material in band or slab form made of two cover plates (1, 2), made of steel, which can be resistance welded together via electrically conductive bodies (4), and an intermediate layer (3) made of a filler material in which the bodies (4) are embedded, with the bodies (4), which are implemented as curved slugs, lying pressed flat between the cover plates (1, 2). This type of composite material is produced in that the filler material (3') for the intermediate layer (3) is applied as a paste to a band (1') serving as the first cover plate (1) as it passes by and the curved slugs (4') are, after being laid on the filler material (3'), pressed into it at least until contact is made via a band (2') supplied as the second cover plate (2) in a welding gap (8) formed by two roller electrodes (6,7) of a resistance welding device and the slugs are largely pressed flat with the bands (1', 2') during welding.

8 Claims, 2 Drawing Sheets

Figure 1:
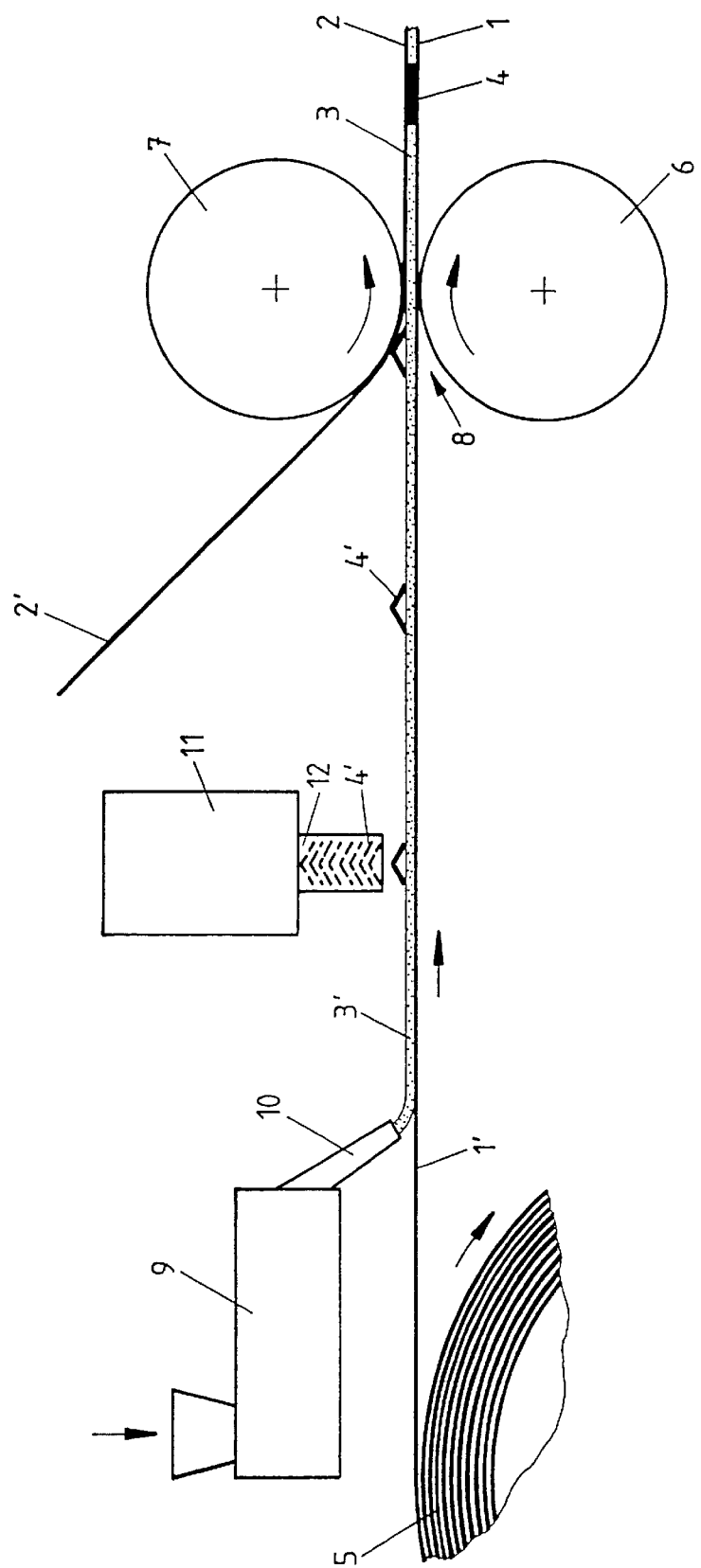

COMPOSITE MATERIAL MADE OF TWO STEEL COVER SHEETS RESISTANCE-WELDED TOGETHER AND AN INTERMEDIATE LAYER

The invention concerns a composite material in band or slab form made of two cover plates, made of steel, which can be resistance welded together via electrically conductive spacer bodies, and an intermediate layer made of a filler material in which the spacer bodies are embedded.

The invention further concerns a process for the production of the composite material in band form and a facility for performing the process.

Composite materials of the type mentioned and processes for their production are known. These types of composite materials are, for example, used as deep-drawn molded components in motor vehicle construction because they have a high moment of inertia of the cross-sectional area in proportion to their weight, and therefore a high buckling stiffness, and are characterized by high oscillation damping and structure-borne sound damping properties.

The composite materials can be supplied as semifinished products in coil form or in slab form. The composite materials are, however, also sometimes further processed by the producers into finished products, for example through deep-drawing, reshaped, and then subjected to a cathodic immersion enameling with subsequent stoving of the enamel. This further processing into finished components can, of course, also be performed by the vehicle manufacturer.

In a known composite material of the type initially mentioned (DE 38 34 829 C2), the electrically conductive bodies consist of a ferrosilicon, stainless steel, or nickel powder, which is admixed into the filling material made of plastic which forms the intermediate layer. In this composite material, the powder, which has grain sizes of 70 to 130% of the thickness of the intermediate layer, exclusively serves for the purpose of allowing the composite material to be resistance welded, in that, during later roller seam or spot welding with a solid plate or another similar bonding plate, it produces the electrical connection between the welding electrodes. In contrast, the transverse strength between the cover plates is produced via the intermediate layer made of plastic, which adheres to the cover plates. Therefore, the intermediate layer has a thickness of a magnitude of approximately 1 mm. In these types of thin intermediate layers, it may also be possible to apply a mixture of plastic and powder whose grain size is up to 130% of the thickness of the intermediate layer.

The invention has as its object the development of a composite material of the type initially mentioned, a process for its production, and a facility for performing the process. The composite material is to have a very thick intermediate layer relative to the cover plates and should particularly be workable by deep-drawing. In this case, the cover plates should essentially provide the composite material with sufficient transverse stiffness and transverse strength.

According to the invention, the composite material of the type initially mentioned is characterized in that the electrically conductive spacer bodies, which are implemented as curved slugs, are pressed flat between the cover plates and are resistance welded to them.

In the composite material according to the invention, the cover plates are firmly bonded with one another via the welded-on slugs, so that the composite material has a high transverse strength of the cover plates relative to one another even as a semifinished product, i.e. before its further processing through reshaping. A further advantage of the composite material according to the invention is that the two cover plates remain essentially flat.

According to an embodiment of the invention, the filler material consists of an epoxy resin which polymerizes, particularly cross-links, only at enamel stoving temperatures. The use of this type of filler material has the advantage that a blank from the composite material can be reshaped into a molded component, particularly by deep-drawing, without problems, because the intermediate layer is also reshaped due to the epoxy resin, which has not yet been cross-linked, and the cover plates are not too greatly stressed and/or the cover plates do not come off of the intermediate layer. Simultaneously, it is also ensured that the intermediate layer is not pressed out from between the cover plates during reshaping due to its rigid state. Finally, for cathodic immersion enameling, to which the molded component is to be subjected, it is guaranteed that the epoxy resin does not melt and run out at the high, sustained temperatures typical for stoving, but polymerizes, thus only then producing the final fixed adhesion of the cover plates with the intermediate layer and providing the molded component with the optimum buckling stiffness.

A mixture of solid and fluid resin with a ratio of 100:20 to 100:10 and a hardener is suitable as the epoxy resin. A substance which minimizes the tendency of the filler material to flow at elevated temperatures, such as microdispersed silicic acid, should be admixed into the epoxy resin. It has also proven useful for reshaping by deep-drawing if the epoxy resin has microspheres made of glass, expanded clay, or aluminum admixed into it. These types of microspheres can be easily displaced or broken without impairing the contact of the slugs with the cover plates, because the fragments press themselves into the zinc coating typically provided on the cover plates or into the cover plates themselves. These types of microspheres should have a diameter of 70–130 $\mu$m, particularly approximately 100 $\mu$m, and a wall thickness of <10 $\mu$m, i.e. they should have a magnitude which is smaller by more than a power of 10 than the thickness of the intermediate layer.

Furthermore, it has been shown to be advantageous if the epoxy resin has a substance which improves the adhesion, such as talcum, and/or a substance which improves the cohesion, such as wollastonite, admixed into it. It is also advantageous if the epoxy resin has at least one corrosion inhibitor admixed into it.

The process portion of the objects mentioned above is achieved in that the filler material for the intermediate layer is applied as a paste on to a band serving as the first cover plate as it passes, and the slugs are pressed into the filler material, after it has been applied, via a band fed as the second cover plate into a welding gap formed by two roller electrodes, at least until the slugs contact the cover plates, and, during welding with the cover plates, the slugs are largely pressed flat.

This type of process has the advantage of continuous production of a semifinished product in which the cover plates are firmly bonded with one another at defined locations by the slugs. The composite material can then be cut into slabs or coiled up. A requirement for coiling is, of course, that the filler material moves along with the deformation into the coil. Insofar as the filler material consists, according to an embodiment of the invention, of a material which only polymerizes at enamel stoving temperatures, this is possible without problems.

It has been shown to be advantageous for the production process if the welding of the slugs with the cover plates in the welding gap is ended before the smallest interval of the welding gap is reached. The further pressing of the composite material together until the smallest interval has been reached then serves for subsequent shaping and allows any gases which have been produced during welding to be pressed out.

The application of the filler material for the intermediate layer is preferably performed by extruding onto the first cover plate, particularly onto a preheated band. The slugs can then be pressed into a filler material of this type until contact is made via the second cover plate without expenditure of a large amount of force.

Uniform distribution of the slugs onto the band can easily be achieved by simultaneously placing multiple slugs on the intermediate layer in one or more rows transverse to the movement direction of the band.

According to a further embodiment, further processing into finished products can be performed subsequently to the process for production of a composite material as a semi-finished product. This is performed by cutting the composite material to size, reshaping the blanks into molded components, particularly through deep-drawing, and then subjecting them to a heat treatment, particularly a cathodic immersion enameling with stoving of the enamel. Before the stove enameling, the composite material can be reshaped without disadvantageous consequences for the epoxy resin and its adhesion to the cover plates. It only polymerizes, particularly cross-links, during the stove enameling, so that the molded component obtains its final buckling stiffness then.

Preferably, the blanks are cut with a laser beam or the intermediate layer is cured at the cut edges with the beam of a laser or a mercury vapor lamp. This, in addition to the effect of the thixotropizing additives on the filler material, impedes the epoxy resin from being pressed out between the cover plates during further processing.

The facility for performing the process described is characterized by two reels with the bands for the cover plates and a resistance welding device formed by two strip electrodes or, preferably, by two roller electrodes whose welding current can be switched on and off at intervals, as well as an application device for the filler material, positioned over the lower of the two bands fed to the welding gap formed by the roller electrodes positioned at a mutual distance, and a feeding device for the slugs, positioned downstream in the direction of movement of the band, whose cycle for releasing of the slugs is synchronized with the welding intervals.

The application device is preferably an extruder with a slot die. The feeding device for the slugs can be a stamping press with multiple embossing stamps and feeding tubes, positioned parallel to one another and transverse to the direction of movement of the band, which each eject a slug during every stamping stroke.

Figure 2:
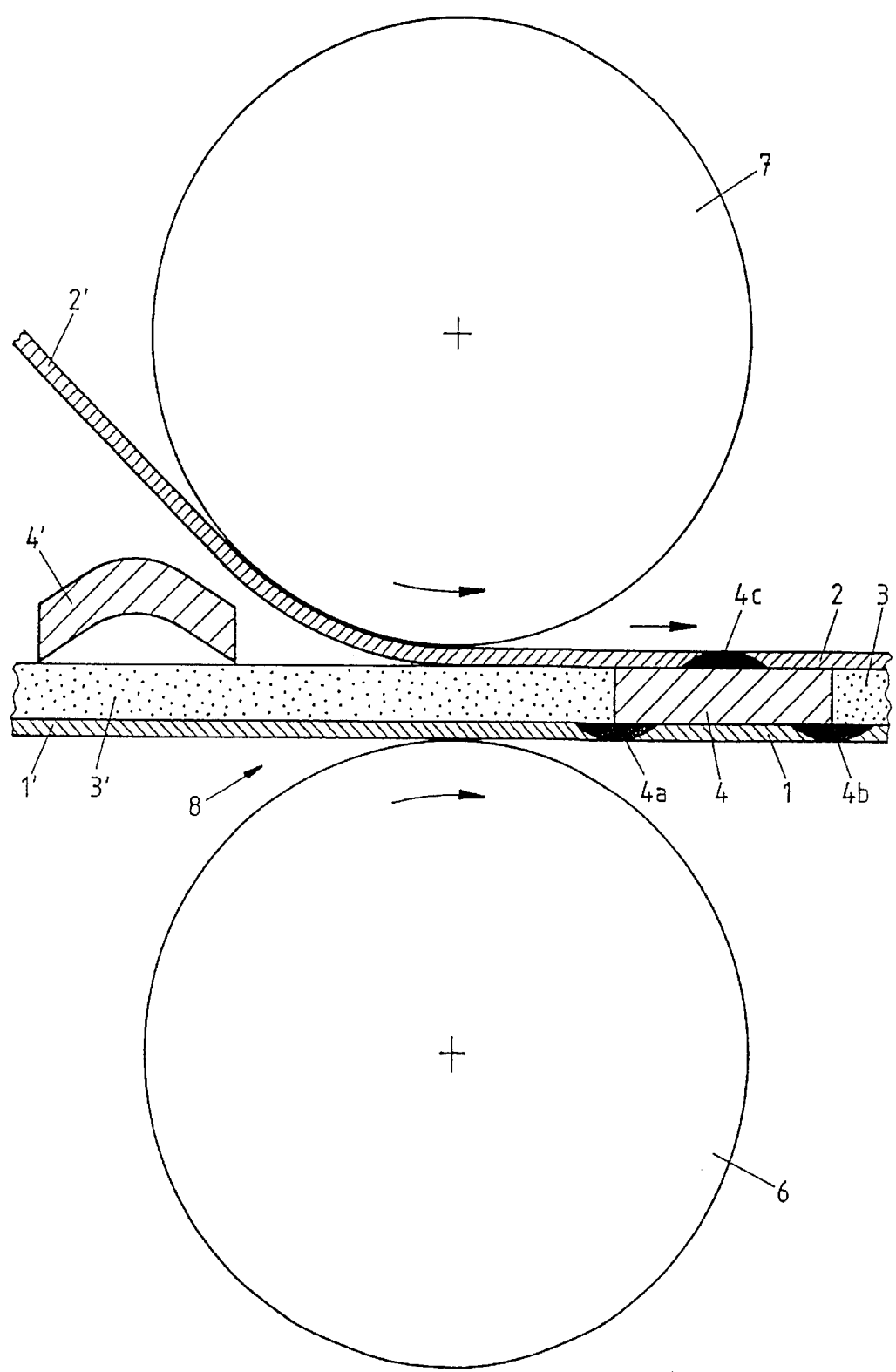

In the following, the invention will be described in more detail with reference to a drawing schematically illustrating an exemplary embodiment of a facility for production of a composite material in band form. Individually, these show:

FIG. 1 the facility for production of a composite material in band form in a side view and FIG. 2 the facility according to FIG. 1 in an enlarged depiction and side view in the region of a welding device.

The composite material in band form to be produced in the facility consists of a lower, preferably zinc coated cover plate 1 made of steel, an upper, preferably zinc coated cover plate 2 made of steel, an intermediate layer 3 made of epoxy resin, and multiple slugs 4 made of steel, uniformly distributed widthwise in rows and lengthwise and lying flat between the cover plates 1, 2. As can be inferred from, above all, FIG. 2, the cover plates 1, 2 have a thickness which is several times less than the intermediate layer 3. The slugs 4 have the same thickness as the intermediate layer 3. Typical dimensions of this type of composite material are a thickness of 0.3 mm for the individual cover plates 1, 2, a thickness of 1.4 mm for the intermediate layer 3, and a diameter of 5 mm for the slugs 4.

The cover plates 1, 2 are drawn off as bands 1', 2' from coils 5, with only the coil 5 for the lower band 1' being illustrated in FIG. 1. The band 1' is supplied, in an essentially horizontal position, to a welding gap 8 formed by two roller electrodes 6, 7 of a resistance welding device. The upper band 2' is supplied at a slant from above to the welding gap 8. The roller electrodes 6, 7 are connected to a current and voltage supply. The welding device allows the cover plates 1, 2 and/or bands 1', 2' which are to be welded together to be supplied with welding current at intervals.

For this purpose, the welding current can be switched on and off in various ways: either via an appropriate switching device or via alternating electrically conductive regions and electrically insulating regions around the circumference of at least one roller electrode 6, 7.

An application device 9 for a filler material 3', an epoxy resin which is not yet been cross-linked, is implemented as an extruder which applies the filler material (epoxy resin) 3' for the intermediate layer 3 in a paste form via a slot die 10. The epoxy resin 3' should have a temperature of somewhat over 100° C. for this purpose. It is preferably applied to the band 1', which has been preheated to approximately the same temperature. The preheating of the band 1' can be performed by previously preheating the coil 5 to this temperature.

A feeding device 11 for curved slugs 4' is positioned downstream from the extruder 9 in the conveyor direction of the band 1'. This feeding device 11 has multiple feeding tubes 12 distributed over the width of the band 1', via which the curved slugs 4' are deposited cyclically and in synchronization with the welding intervals of the roller electrodes 6, 7. The feeding device 11 can be equipped as a stamping press with multiple embossing stamps provided with an indentation, so that as the slugs are stamped out of a sheet metal strip, the slugs 4' obtain a curved shape, as is shown above all in FIG. 2.

The feeding device 11 can be designed in such a way that, during each stamping operation, with which a slug 4' is inserted at one end of the feeding tubes 12, a slug 4' is ejected from the other end.

The lower band 1', with the epoxy resin 3' extruded onto it and the slugs 4' laid on it, is fed into the welding gap 8. In this welding gap 8, the upper roller electrode 7 presses the curved slugs 4', via the upper band 2', into and far enough through the epoxy resin 3' that their sharp lower edges come into contact with the lower band 1' and a quasi line contact is produced. Due to their convex curvature on the upper side, a line contact with the upper band 2' essentially also occurs. If the welding current is now switched on, then high contact resistances are produced at these contact points, so that the slugs 4' are welded to the bands 1', 2'. The slugs 4' are hereby simultaneously also pressed flat. Even before the slugs 4' have reached the smallest interval between the roller electrodes 6, 7, the welding current is switched off and only pressing together of the composite material occurs. The result can be seen in FIG. 2 at the outlet of the welding gap 8, namely that the slug 4 is essentially pressed flat and, in the region of the line contacts, has formed welded regions 4a, 4b, 4c.

The composite material in band form produced in this way can then either be cut into slabs or coiled up. Subsequently, either the band producer or the finisher performs the cutting to size and reshaping and cathodic immersion enameling with stoving of the enamel. As a result, one obtains a molded component which, relative to its inherent stability, has a low weight and acts to reduce noise and vibration.

What is claimed is:

1. A composite material in band or slab form comprising first and second steel cover plates, an intermediate layer made of a filler material and electrically conductive spacer bodies embedded within the filler material, wherein the electrically conductive spacer bodies comprise curved slugs which have been pressed flat between the cover plates, and wherein the electrical conductive spacer bodies are resistance welded to the cover plates, the first and second cover plates being resistance welded to each other via the electrically conductive spacer bodies.

2. The composite material according to claim 1, wherein the filler material of the intermediate layer comprises an epoxy resin.

3. The composite material according to claim 2, wherein the epoxy resin is a mixture of solid and liquid resin in a ratio of 100:20 to 100:10 and a hardener.

4. The composite material according to claim 3, wherein a substance which reduces the tendency of the filler material to flow is admixed into the epoxy resin.

5. The composite material according to claim 3, wherein microspheres are admixed into the epoxy resin.

6. The composite material according to claim 2, wherein a substance which improves adhesion is admixed into the epoxy resin.

7. The composite material according to claim 2, wherein a material which improves cohesion is admixed into the epoxy resin.

8. The composite material according to claim 2, wherein at least one corrosion inhibitor is admixed into the epoxy resin.

* * * * *